United States Patent
Lo et al.

(10) Patent No.: US 12,353,941 B2
(45) Date of Patent: Jul. 8, 2025

(54) METHOD FOR NEAR FIELD COMMUNICATION WITH SERIAL INTERFACE MICROCONTROLLER AND NFC TAG DEVICE USING THE SAME

(71) Applicant: Generalplus Technology Inc., Hsinchu (TW)

(72) Inventors: Li Sheng Lo, Hsinchu (TW); Pei-Chien Hsu, Hsinchu (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 18/530,531

(22) Filed: Dec. 6, 2023

(65) Prior Publication Data
US 2024/0256802 A1    Aug. 1, 2024

(30) Foreign Application Priority Data
Jan. 31, 2023    (TW) ................. 112103267

(51) Int. Cl.
*G06K 7/10* (2006.01)
*H04B 5/70* (2024.01)

(52) U.S. Cl.
CPC ........... *G06K 7/10297* (2013.01); *H04B 5/70* (2024.01)

(58) Field of Classification Search
CPC .............................. G06K 7/10297; H04B 5/70
USPC ........................................................... 235/492
See application file for complete search history.

(56) References Cited

U.S. PATENT DOCUMENTS

| | | | |
|---|---|---|---|
| 10,361,474 B2* | 7/2019 | Ding ................. | G06K 19/0727 |
| 2010/0248653 A1* | 9/2010 | Merlin ..................... | H04B 5/79 |
| | | | 455/90.1 |
| 2019/0140358 A1* | 5/2019 | Antonetti ............... | H01Q 13/10 |
| 2020/0313642 A1* | 10/2020 | Mimino ................. | H04B 5/263 |

* cited by examiner

*Primary Examiner* — Ahshik Kim
(74) *Attorney, Agent, or Firm* — MUNCY, GEISSLER, OLDS & LOWE, P.C.

(57) ABSTRACT

A method for near field communication with a serial transmission microcontroller and an NFC tag device using the same are provided in the present invention. The method includes: providing a serial interface microcontroller; capturing an NFC carrier signal from an NFC LC resonant circuit; performing a frequency division to the NFC carrier signal to obtain a NFC clock signal; filtering the NFC carrier signal from the NFC LC resonant circuit to obtain an envelope signal; sequentially receiving a digital sequence of the envelope signal according to triggering of the NFC clock signal based on a serial transmission protocol; and decoding an NFC data from the digital sequence based on an NFC transmission protocol rule.

14 Claims, 13 Drawing Sheets

METHOD FOR NEAR FIELD COMMUNICATION WITH SERIAL INTERFACE MICROCONTROLLER AND NFC TAG DEVICE USING THE SAME

CROSS-REFERENCE TO RELATED APPLICATIONS

This application claims priority of No. 112103267 filed in Taiwan R.O.C. on Jan. 31, 2023 under 35 USC 119, the entire content of which is hereby incorporated by reference.

BACKGROUND OF THE INVENTION

Field of the Invention

The present invention relates to the technology of near field communication, more particularly, the present invention relates to a method for near field communication (NFC) with serial transmission microcontroller and NFC tag device using the same.

Description of the Related Art

Near-Field Communication (NFC) is a communication protocol that enables communication between two electronic devices within a distance of 4 centimeters or less. Near-Field Communication provides low-speed connectivity with simple setup and can be used for more powerful wireless connections.

The application of near-field communication transmission is becoming more and more popular, but general microprocessors (microcontrollers, MCUs) do not have specific circuit for NFC, and the bit rate of near-field communication is relatively high such that it is required to adopt a specific integrated circuit to implement the application of NFC. Thus, the cost of the specific integrated circuit for NFC is much higher than that of a general processor.

BRIEF SUMMARY OF THE INVENTION

An object of the present invention is to provide a method for near field communication with serial interface microcontroller and an NFC tag device using the same, so as to perform uplink and downlink transmission of NFC without using a specific NFC integrated circuit.

In view of this, the invention provides an NFC tag device. The NFC tag device includes an NFC LC resonant circuit, a frequency dividing circuit, an envelope detecting circuit and a serial interface microcontroller. The NFC LC resonant circuit include a first terminal and a second terminal. The frequency dividing circuit includes an input terminal and an output terminal, wherein the input terminal of the frequency dividing circuit is coupled to the first terminal of the NFC LC resonant circuit. The envelope detecting circuit includes an input terminal and an output terminal, wherein the input terminal of the envelope detecting circuit is coupled to the first terminal of the NFC LC resonant circuit. The serial interface microcontroller includes a clock input terminal and a serial data input terminal, wherein the clock input terminal of the serial interface microcontroller is coupled to the output terminal of the frequency dividing circuit, and the serial data input terminal of the serial interface microcontroller is coupled to the output terminal of the envelope detecting circuit. The frequency dividing circuit divides an NFC carrier signal from the first terminal of the NFC LC resonant circuit into an NFC clock signal. The envelope detecting circuit converts the received signal into an envelope signal. The clock input terminal of the serial interface microcontroller receives the NFC clock signal, and the serial data input terminal of the serial interface microcontroller receives the envelope signal, for decoding an NFC data from the envelope signal according to the NFC protocol.

In the apparatus according to a preferred embodiment of the present invention, the NFC tag device further includes a DC blocking circuit. The DC blocking circuit includes a first terminal and a second terminal, wherein the first terminal of the DC blocking circuit is coupled to the first terminal of the NFC LC resonant circuit, and the second terminal of the DC blocking circuit is coupled to the input terminal of the frequency dividing circuit for passing the NFC carrier signal. In a preferred embodiment, the NFC tag device further includes a bias circuit, coupled between the DC blocking circuit and the input terminal of the frequency dividing circuit such that the NFC carrier signal is operated between a power voltage and a common voltage.

In the NFC tag device according to a preferred embodiment of the present invention, the bias circuit includes a first resistor and a second resistor. The first resistor includes a first terminal and a second terminal, wherein the first terminal of the first resistor is coupled to the power voltage, and the second terminal of the first resistor is coupled to the second terminal of the DC blocking circuit. The second resistor includes a first terminal and a second terminal, wherein the first terminal of the second resistor is coupled to the second terminal of the DC blocking circuit, and the second terminal of the second resistor is coupled to the common voltage.

In the NFC tag device according to a preferred embodiment of the present invention, the envelope detecting circuit includes a third resistor, a fourth resistor, a first unidirectional conduction element, a second unidirectional conduction element, a first transistor and a first capacitor. The third resistor includes a first terminal and a second terminal, wherein the first terminal of the third resistor is coupled to a power voltage. The first unidirectional conduction element includes a first terminal and a second terminal, wherein the first terminal of the first unidirectional conduction element is coupled to the second terminal of the third resistor, and the second terminal of the first unidirectional conduction element is coupled to the input terminal of the envelope detecting circuit, wherein the first unidirectional conduction element limits a current flowing from the first terminal of the first unidirectional conduction element through the second terminal of the first unidirectional conduction element. The first transistor includes an emitter terminal, a collector terminal and a base terminal, wherein the emitter terminal of the first transistor is coupled to a common voltage, the collector terminal of the first transistor is coupled to the first terminal of the first unidirectional conduction element, the base terminal of the first transistor is coupled to the second terminal of the first unidirectional conduction element. The second unidirectional conduction element includes a first terminal and a second terminal, wherein the first terminal of the second unidirectional conduction element is coupled to the output terminal of the envelope detecting circuit, and the second terminal of the second unidirectional conduction element is coupled to the collector terminal of the first transistor, wherein the second unidirectional conduction element limits a current flowing from the first terminal of the second unidirectional conduction element through the second terminal of the second unidirectional conduction element. The first capacitor includes a first terminal and a second terminal, wherein the first terminal of the first capacitor is coupled to the first terminal of the second unidirectional conduction element, and the second terminal of the first capacitor is coupled to the common voltage. The fourth resistor includes a first terminal and a second terminal, wherein the first terminal of the fourth resistor is coupled to the power voltage, and the second terminal of the fourth resistor is coupled to the first terminal of the second unidirectional conduction element.

In the NFC tag device according to a preferred embodiment of the present invention, the envelope detecting circuit further includes a second capacitor, a fifth resistor and a sixth resistor. The second capacitor includes a first terminal and a second terminal, wherein the first terminal of the second capacitor is coupled to the output terminal of the envelope detecting circuit, and the second terminal of the second capacitor is coupled to the first terminal of the second unidirectional conduction element. The fifth resistor includes a first terminal and a second terminal, wherein the first terminal of the fifth resistor is coupled to the power voltage, and the second terminal of the fifth resistor is coupled to the first terminal of the second capacitor. The sixth resistor includes a first terminal and a second terminal, wherein the first terminal of the sixth resistor is coupled to the first terminal of the second capacitor, and the second terminal of the sixth resistor is coupled to the common voltage.

In the NFC tag device according to a preferred embodiment of the present invention, the serial interface microcontroller further includes a serial data output terminal, and the NFC tag device further includes a switching circuit, wherein the switching circuit includes a first terminal, a second terminal and a control terminal, wherein the control terminal of the switching circuit is coupled to the serial data output terminal of the serial interface microcontroller, the first terminal of the switching circuit is coupled to the first terminal of the NFC LC resonant circuit, and the second terminal of the switching circuit is coupled to the second terminal of the NFC LC resonant circuit, wherein the clock input terminal of the serial interface microcontroller receives the NFC clock signal, for outputting an NFC output data according to the NFC protocol by controlling the conduction state of the first terminal and the second terminal of the switching circuit.

In the NFC tag device according to a preferred embodiment of the present invention, the NFC LC resonant circuit includes a NFC resonant coil and a resonant capacitor. The NFC resonant coil includes a first terminal and a second terminal, wherein the first terminal of the NFC resonant coil is coupled to the first terminal of the NFC LC resonant circuit, and the second terminal of the NFC resonant coil is coupled to the second terminal of the NFC LC resonant circuit. The resonant capacitor includes a first terminal and a second terminal, wherein the first terminal of the resonant capacitor is coupled to the first terminal of the NFC LC resonant circuit, and the second terminal of the resonant capacitor is coupled to the second terminal of the NFC LC resonant circuit.

In the NFC tag device according to a preferred embodiment of the present invention, the serial interface microcontroller receives the envelope signal according to Serial Peripheral Interface (SPI). In another preferred embodiment, the serial interface microcontroller receives the envelope signal according to Integrated Interchip Sound (I2S).

The invention further provides a method for near field communication with serial interface microcontroller. The method includes: providing a serial interface microcontroller; acquiring an NFC carrier signal from an NFC LC resonant circuit; frequency-dividing the NFC carrier signal to acquire an NFC clock signal; acquiring an envelope signal by detecting an envelope of the NFC carrier signal of the NFC LC resonant circuit; sequentially receiving a digital sequence of the envelope signal according to triggering of the NFC clock signal and a serial transmission protocol; and decoding the digital sequence of the envelope signal to acquire a NFC data according to an NFC protocol.

In the method for near field communication with serial interface microcontroller according to a preferred embodiment of the present invention, the serial interface protocol is Serial Peripheral Interface (SPI) such that the envelope signal is received according to SPI protocol. In another preferred embodiment, the serial interface protocol is Integrated Interchip Sound (I2S) such that the envelope signal is received according to I2S protocol.

In the method for near field communication with serial interface microcontroller according to a preferred embodiment of the present invention, the method further includes: providing a switching circuit, coupled between the first terminal of the NFC LC resonant circuit and the second terminal of the NFC LC resonant circuit; and outputting an NFC output data according to the NFC protocol by controlling the conduction state of the switching circuit.

The spirit of the preferred embodiment of the present invention is to use the carrier signal extracted from the NFC coil, and a clock signal corresponding to the NFC modulation frequency is generated by frequency dividing to transmit it to the serial interface microcontroller. And, the modulated signal is then picked up by the NFC coil, and the binary digital sequence is demodulated by the envelope detecting circuit. And, the binary digital sequence is sequentially transmitted into the serial interface microcontroller according to the above-mentioned clock signal. Afterwards, through the serial interface microcontroller, the binary digital sequence of NFC is decoded into a near field communication data. Thus, the present invention can decode the near field communication data without using a specific integrated circuit for NFC, and the cost can be reduced.

The above-mentioned and other objects, features and advantages of the present invention will become more apparent from the following detailed descriptions of preferred embodiments taken in conjunction with the accompanying drawings.

DETAILED DESCRIPTION OF THE INVENTION

Figure 1:
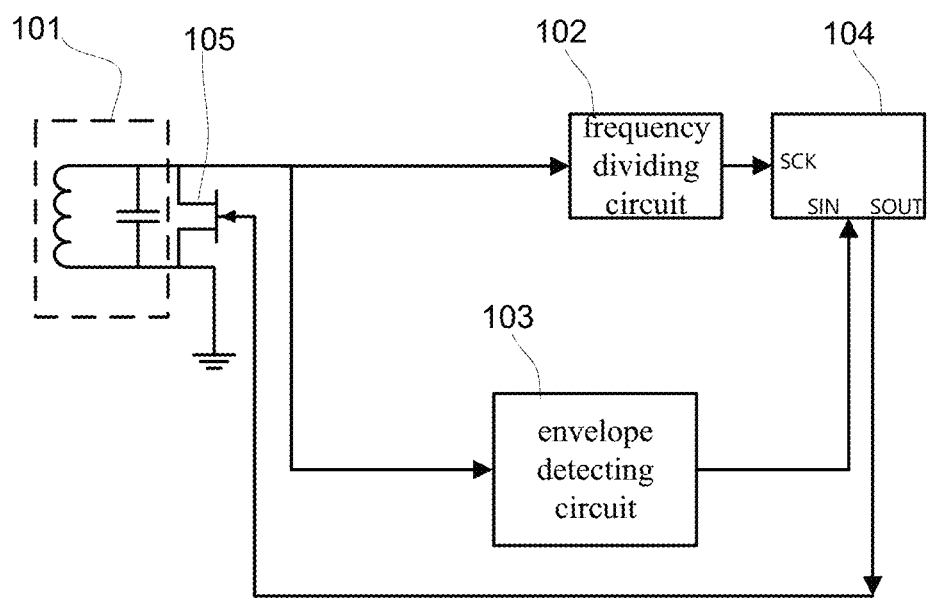
FIG. 1 illustrates a circuit block diagram depicting an NFC tag device according to a preferred embodiment of the present invention.

The exemplary embodiments of the present invention, which are illustrated in the accompanying drawings, are provided. Wherever possible, the same reference numbers are used in the drawings and description to refer to the same or like parts. In addition, the practice of the exemplary embodiment is only one of the implementations of the design concept of the present invention, and thus, the present invention is not limit thereto.

FIG. 1 illustrates a circuit block diagram depicting an NFC tag device according to a preferred embodiment of the present invention. Referring to FIG. 1, the NFC tag device includes an NFC LC resonant circuit 101, a frequency dividing circuit 102, an envelope detecting circuit 103, a serial interface microcontroller 104 and a switching circuit 105. The NFC LC resonant circuit 101 in this embodiment adopts an NFC resonant coil and a resonant capacitor in a parallel circuit as an example. The frequency dividing circuit 102 includes an input terminal and an output terminal, wherein the input terminal of the frequency dividing circuit 102 is coupled to the first terminal of the NFC LC resonant circuit 101. The envelope detecting circuit 103 includes an input terminal and an output terminal, wherein the input terminal of the envelope detecting circuit 103 is coupled to the first terminal of the NFC LC resonant circuit 101. The serial interface microcontroller 104 includes a clock input terminal SCK, a serial data input terminal SIN and a serial data output terminal SOUT, wherein the clock input terminal SCK of the serial interface microcontroller 104 is coupled to the output terminal of the frequency dividing circuit 102, and the serial data input terminal SIN of the serial interface microcontroller 104 is coupled to the output terminal of the envelope detecting circuit 103. The serial data output terminal SOUT of the serial interface microcontroller 104 is coupled to the control terminal of the switching circuit 105 so as to control the conduction state between the first terminal and the second terminal of the switching circuit 105.

Near field communication (NFC) is based on inductive coupling between two antennas, wherein the one-way or two-way communication is performed on equipment supporting NFC by using carrier frequency of 13.56 MHz and ISO/IEC18000-3 under the globally available unlicensed radio frequency ISM band air interface standard. According to different specifications, there are two main standards for NFC, ISO 14443 and ISO 15693. A general NFC tag device will only comply with one of the specifications. And the NFC tag reading device will output signals to the external NFC tag device respectively by means of polling according to the above two specifications, and wait for the response from the external NFC tag device.

Figure 2:
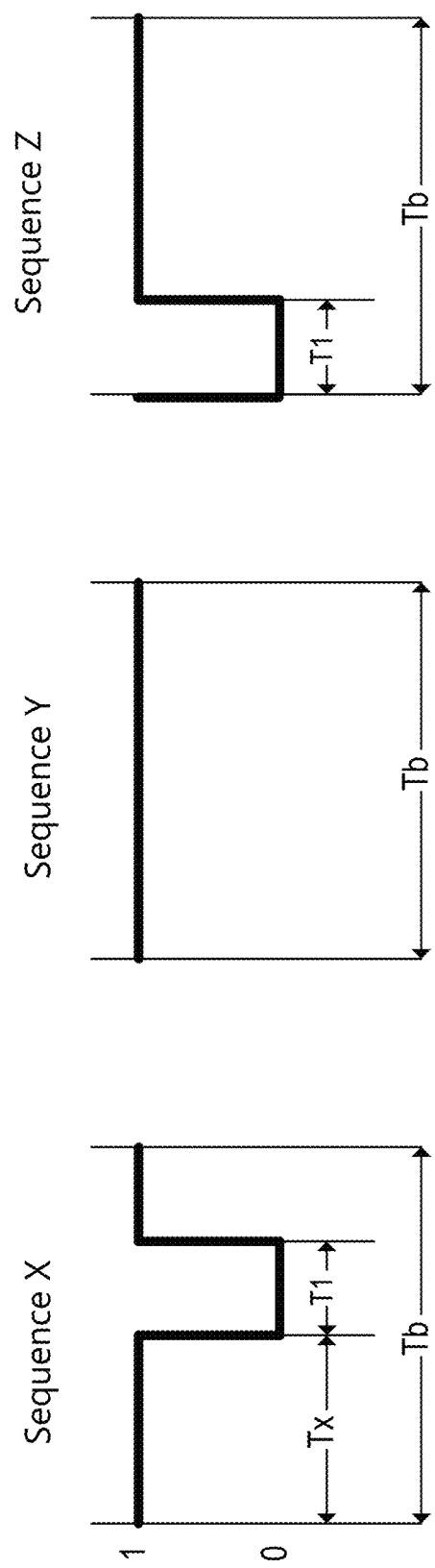
FIG. 2 illustrates a schematic diagram depicting three symbols of ISO 14443A during downlink transmission.

First, it is assumed that the NFC tag device adopts ISO 14443A standard, wherein the data transmission rate is 106 Kbps. In downlink transmission, which is the signal from NFC reading device to NFC tag device, the Modified Miller encoding is adopted, and the modulation adopts 100% ASK. The Modified Miller encoding with 100% ASK includes 3 kinds of symbols. As shown in FIG. 2, FIG. 2 illustrates a schematic diagram depicting three symbols of ISO 14443A during downlink transmission. The symbols include sequence X, sequence Y and sequence Z, wherein Tb=9.44 us; Tx=4.72 us; T1=2.36 us. The logic low voltage (0 in FIG. 2) is modulated state, and the logic high voltage (1 in FIG. 2) is unmodulated state.

In the above FIG. 2 and the abovementioned data, the Modified Miller encoding is encoded with subcarrier frequency of 423.75 KHz. Thus, in this embodiment, the NFC carrier signal of 13.56 MHz has to be divided into 32 to obtain the clock signal with the frequency of 423.75 KHz.

In the Modified Miller encoding in this embodiment, the logic 1 is corresponding to the sequence X, wherein the digital sequence X is binary 1101, and the logic 0 is corresponding to the sequence Y, wherein the digital sequence Y is binary 1111. When more than two logic 0s are transmitted in sequence, the second and subsequent logic 0s would adopt the sequence Z, wherein the digital sequence Z is binary 0111. A logic 0 coordinating the abovementioned sequence Y represents "end of communication." Thus, when the preceding bit of the "end of communication" symbol is logic 1 (binary 1101), the "end of communication" symbol is two sequence Y (binary 11111111). When the preceding bit of the "end of communication" symbol is logic 0 (binary 01111), the "end of communication" symbol is one sequence Z and one sequence Y (binary 01111111). The "No information" symbol is two sequence Y. Moreover, the "start of communication" symbol is sequence Z.

In this embodiment, the serial interface microcontroller 104 adopts Serial Peripheral Interface (SPI) protocol for receiving and transmission data. The frequency dividing circuit 102 receives the 13.56 MHz carrier signal and divides it into 32 to obtain the clock signal of 423.75 KHz to provide SPI clock signal SPI CLK to the serial interface microcontroller 104. Moreover, the "start of communication" symbol is sequence Z, the first binary bit of the sequence Z is logic low voltage. In this embodiment, the logic low voltage is adopted for triggering the SPI's operation.

Figure 3:
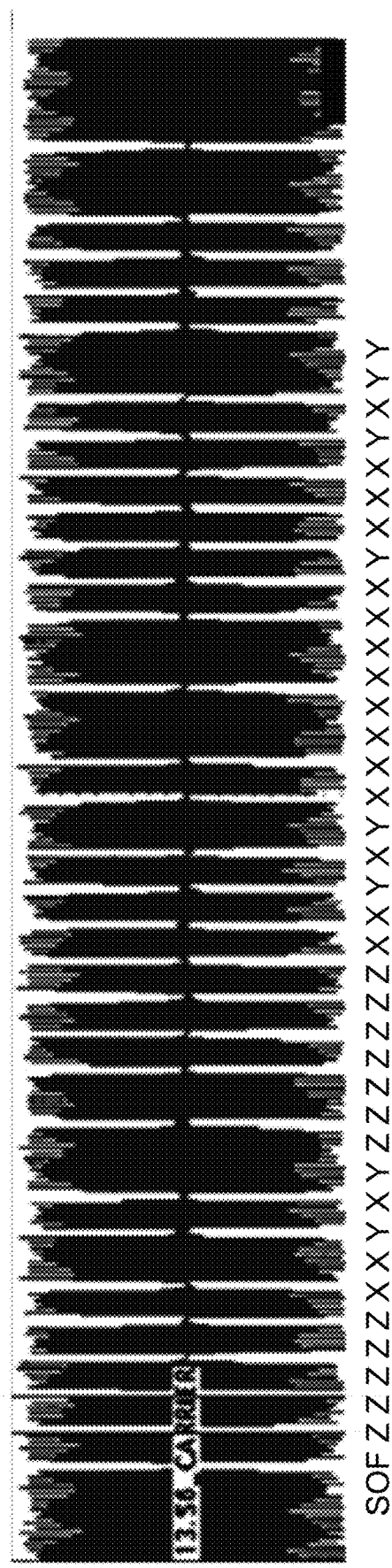
FIG. 3 illustrates a schematic diagram depicting a received signal of ISO 14443A received by the NFC tag device according to a preferred embodiment of the present invention.

For example, The NFC reading device starts to transmit the signal as shown in FIG. 3. FIG. 3 illustrates a schematic diagram depicting a received signal of ISO 14443A received by the NFC tag device according to a preferred embodiment of the present invention. Referring to FIG. 3, when an NFC carrier is received, the frequency dividing circuit 102 divides the NFC carrier signal of the first terminal of the NFC LC resonant circuit into an NFC clock signal to serve as the serial peripheral interface clock signal (SPI CLK) to the clock input terminal SCK of the serial interface microcontroller 104. When the sequence Z of the "start of communication" symbol is received, the serial peripheral interface is triggered, and the serial data input terminal SIN of the serial interface microcontroller 104 sequentially receive the envelope of FIG. 3 from the output terminal of the envelope detecting circuit 103, and the serial interface microcontroller 104 temporally stores the received signal into the memory of the serial interface microcontroller 104 by, for example, the direct memory access (DMA) method.

As for this embodiment, the received sequence is SOF (Start Of Frame) Z, Z, Z, Z, Z, Z, X, X, Y, X, Y, Z . . . Y, Y (End Of Frame, EOF), the data received by the corresponding sequence from the serial peripheral interface is as follows: 0111, 0111, 0111, 0111, 0111, 0111, 1101, 1101, 1111, 0111, 1111, 0111 . . . , 1111, 1111.

Afterward, the serial interface microcontroller 104 decodes from the abovementioned raw data to 00000110100000001101 . . . 0100 according to the Modified Miller encoding. Thus, the data from NFC reading device to NFC tag device can be decoded.

Figure 4:
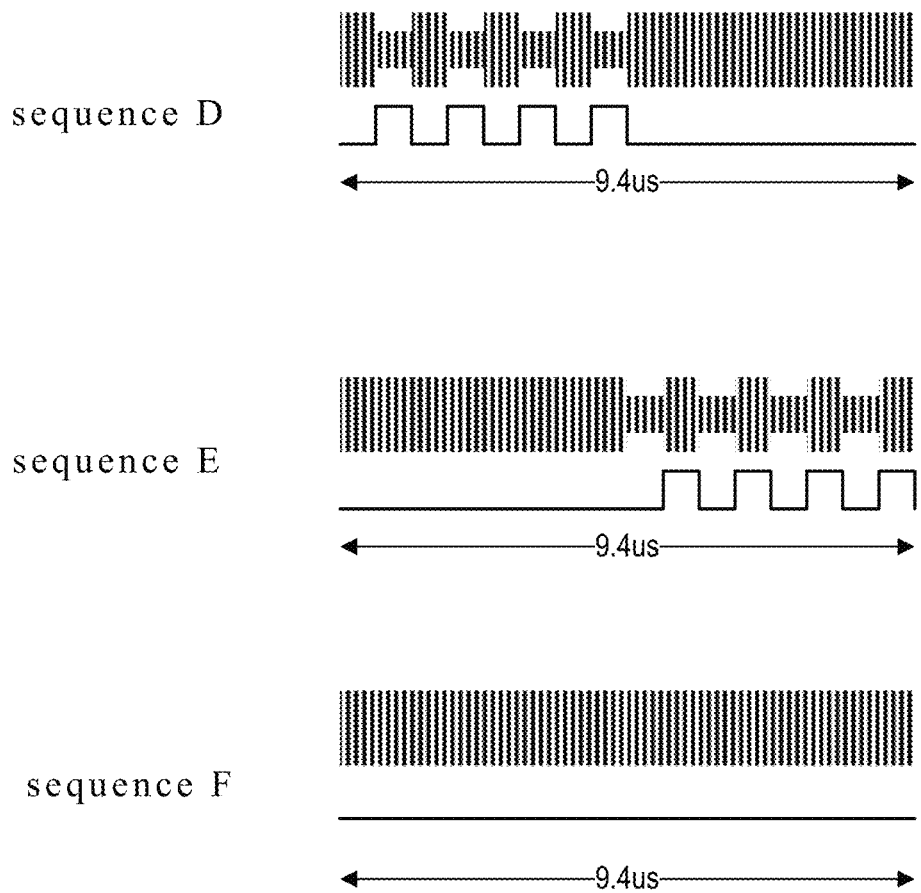
FIG. 4 illustrates a schematic diagram depicting three symbols of ISO 14443A during uplink transmission.

As for the uplink transmission, that is, the part where the NFC tag device transmits data to the NFC reading device, Manchester code (Manchester code) is adopted, and the modulation method is On-Off Keying (OOK), this modulation method includes 3 kinds of symbols, as shown in FIG. 4, FIG. 4 illustrates a schematic diagram depicting three symbols of ISO 14443A during uplink transmission. The abovementioned symbols include sequence D, sequence E and sequence F, wherein the sequence D is the first 50% modulation, the sequence E is the last 50% modulation, and the sequence F is no modulation (pure NFC carrier signal).

Logic 1 corresponds to the abovementioned sequence D; Logic 0 corresponds to the abovementioned sequence E; End of communication corresponds to the abovementioned sequence F; Start of communication also corresponds to the abovementioned sequence D. The frequency of the abovementioned modulated subcarrier is 1.696 MHz, so the frequency dividing circuit 102 divides the 13.56 MHz carrier signal transmitted by the NFC reading device by 8 to obtain a 1.696 MHz clock when an uplink transmission link is performed.

Figure 5:
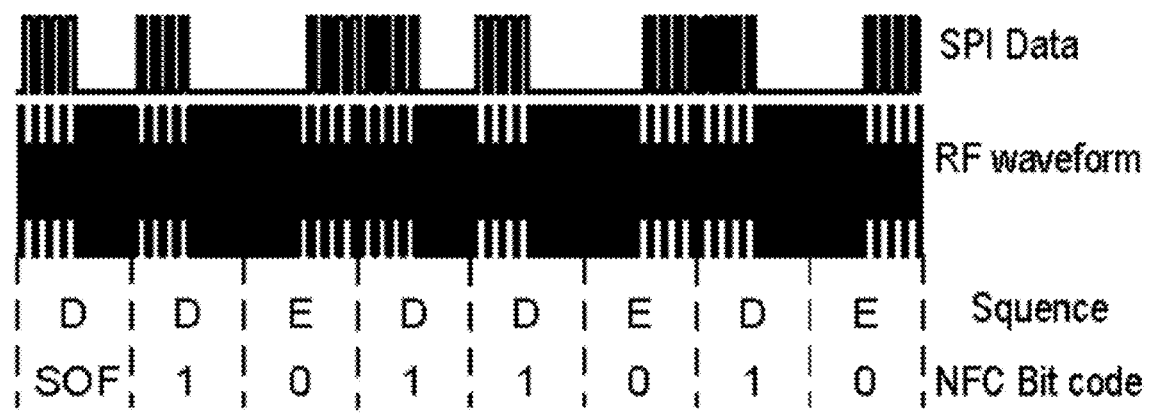
FIG. 5 illustrates a schematic diagram depicting a transmission signal of ISO 14443A transmitted by the NFC tag device according to a preferred embodiment of the present invention.

In order to simply describe the abovementioned encoding process by the NFC tag device, FIG. 5 illustrates a schematic diagram depicting a transmission signal of ISO 14443A transmitted by the NFC tag device according to a preferred embodiment of the present invention. Referring to FIG. 5, in this embodiment, it is assumed that the transmission data is 1011010 . . . , the corresponding sequences are D (Start of Frame, SOF), D, E, D, D, E, D, E . . . . Those sequences would be converted into 0101010100000000, 0101010100000000, 0000000001010101, 0101010100000000, 0101010100000000, 0000000001010101, 101010100000000, 0000000001010101 . . . , and stored into the memory. The serial interface microcontroller 104 uses the 1.696 MHz clock as the SPI clock signal (SPI CLK) to sequentially fetch from the memory and output to the serial data output terminal SOUT of the serial interface microcontroller 104 by, for example, the method of Direct Memory Access (DMA), so as to control the conduction state of the switching circuit 105. Thus, the above data 1011010 . . . is transmitted to the NFC reading device.

Figure 6:
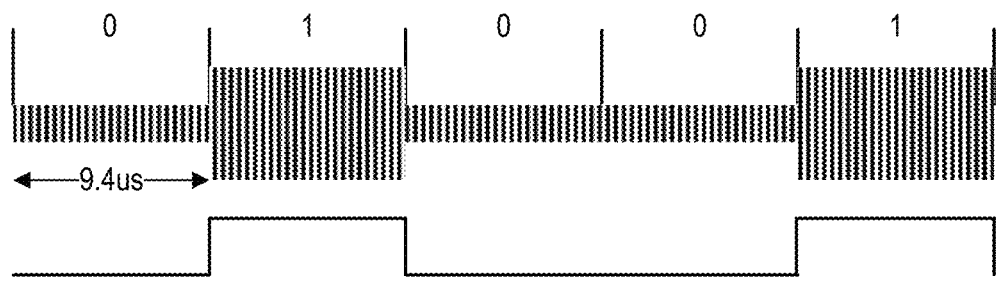
FIG. 6 illustrates a schematic diagram depicting symbols of ISO 14443B during downlink transmission.

Next, it is assumed that the NFC tag device is ISO 14443B NFC tag device, wherein the data transmission rate may be 106/212/424/848 Kbps. When the downlink transmission is performed, that is, the NFC reading device transmits the NFC tag device, it uses the non-return-to-zero (NRZ) line code. And, the modulation method is 10% Amplitude Shift Keying (ASK). In the NRZ line code, when it is logic 0, the signal is modulated, and when it is logic 1, the signal is a low voltage of 10% amplitude. As shown in FIG. 6, FIG. 6 illustrates a schematic diagram depicting symbols of ISO 14443B during downlink transmission. Therefore, as long as the envelop is captured by the envelope detecting circuit 103 and then compared with the threshold, the serial peripheral interface can be used to receive data corresponding to 106 KHz (or higher frequency).

Figure 7:
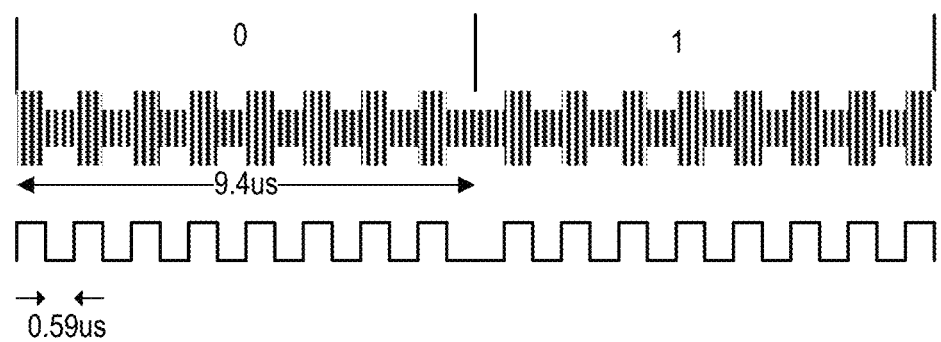
FIG. 7 illustrates a schematic diagram depicting symbols of ISO 14443B during uplink transmission.

Similarly, in the uplink transmission, the modulation adopts NRZ and BPSK (Binary Phase Shift Keying). The clock frequency corresponding to serial peripheral interface is 1.696 MHz. As shown in FIG. 7, FIG. 7 illustrates a schematic diagram depicting symbols of ISO 14443B during uplink transmission. Referring to FIG. 7, in the uplink transmission, the logic 1 is encoded into "0101010101010101", and the logic 0 is encoded into "1010101010101010". The phase difference between the encoded logic 1 and the encoded logic 0 is 180 degree. Thus, when the NFC tag device transmits data to the NFC reading device, the serial interface microcontroller 104 output the encoded data from the serial data output terminal SOUT by direct memory access (DMA) according to SPI clock SPI CLK with 1.696 MHz to control the conduction of the switching circuit 105 such that the data can be transmitted to NFC reading device.

Figure 8:
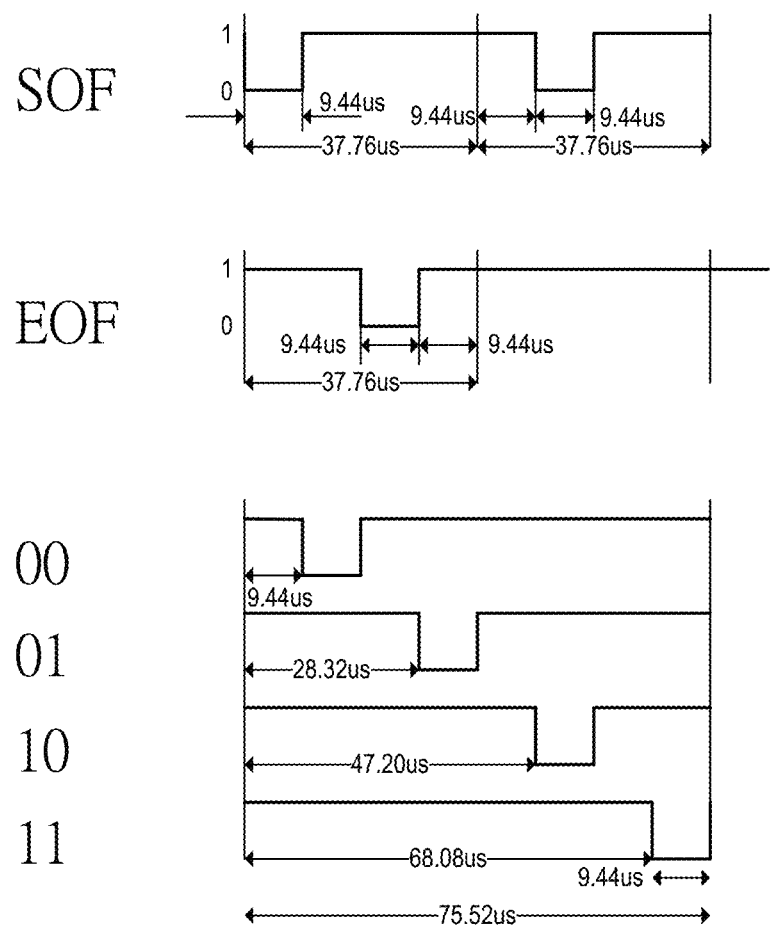
FIG. 8 illustrates a schematic diagram depicting symbols of ISO 15693 during downlink transmission.

Likewise, it is assumed that the NFC tag device is ISO 15693 NFC tag device. In the downlink transmission, that is, the NFC reading device transmits data to NFC tag device, the modulation adopts Pulse-position modulation (PPM) with 106 KHz subcarrier and 100% Amplitude Shift Keying (ASK) or 10%~30% ASK. Its main symbols are as shown in FIG. 8, FIG. 8 illustrates a schematic diagram depicting symbols of ISO 15693 during downlink transmission. Referring to FIG. 8, the symbol "SOF" (Start of Frame) is "01111011", and its corresponding clock frequency is 106 KHz; the symbol "EOF" (End of Frame) is "11011111". The symbols "00", "01", "10" and "11" respectively are "10111111", "11101111", "11111011" and "11111110".

In this embodiment, the first bit (logic 0) of the symbol "SOF" is also adopted for triggering serial peripheral interface to perform data receiving.

Figure 9:
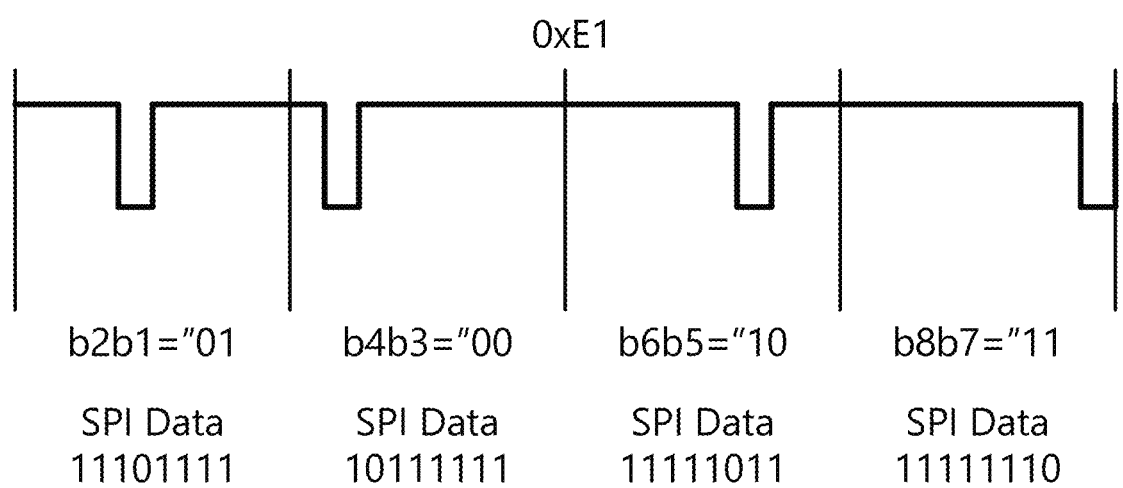
FIG. 9 illustrates a schematic diagram depicting a receiving signal of ISO 15693 received by the NFC tag device according to a preferred embodiment of the present invention.

For example, the NFC reading device starts to transmit 0xE1, such as the signal in FIG. 9, FIG. 9 illustrates a schematic diagram depicting a receiving signal of ISO 15693 received by the NFC tag device according to a preferred embodiment of the present invention. Referring to FIG. 9, 0xE1 is "11100001" in binary. However, it is received in sequence with 01, 00, 10, and 11 in data transmission. When the carrier signal is received, the frequency dividing circuit 102 divides an NFC carrier signal at the first end of the NFC LC resonant circuit to output a 106 KHz NFC clock signal as a serial peripheral interface clock signal (SPI CLK) to the clock input terminal SCK of the serial interface microcontroller 104. After receiving the "SOF", the serial peripheral interface is triggered, and the serial data input terminal SIN of the serial interface microcontroller 104 receives 11101111, 10111111, 11111011, 11111110 from the output terminal of the envelope detecting circuit 103 in sequence. And DMA (direct memory access) method is adopted to temporarily store the received signal in the memory of the serial interface microcontroller 104.

Afterwards, the serial interface microcontroller 104 decodes the above-mentioned received raw data into 01, 00, 10, and 11 according to the above-mentioned PPM (pulse-position modulation). Thus, the data 0xE1 transmitted from the NFC reading device to the NFC tag device can be decoded.

Figure 10:
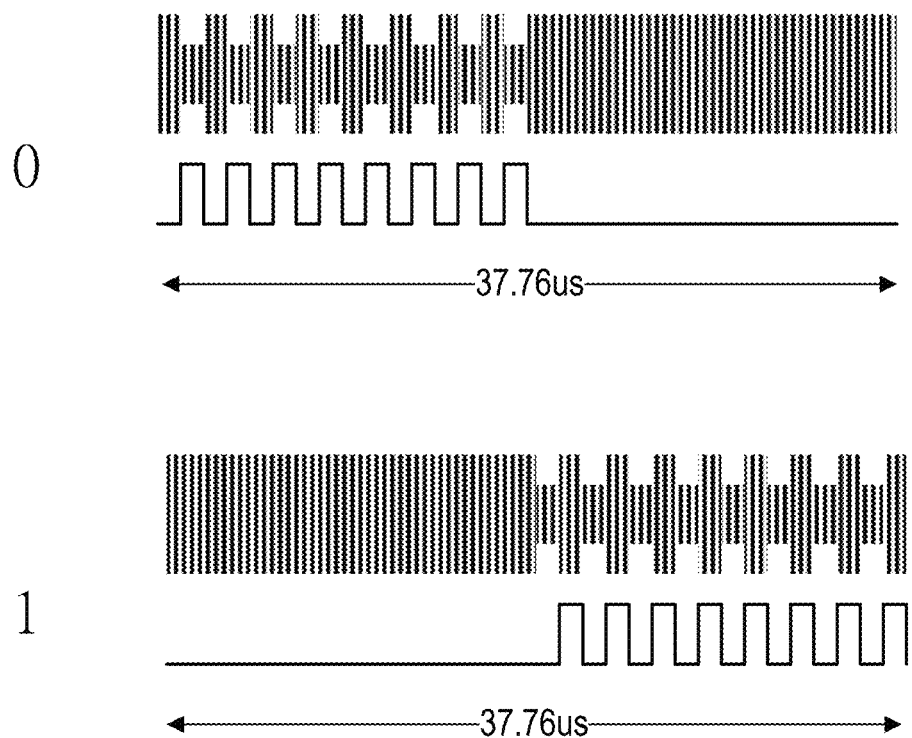
FIG. 10 illustrates a schematic diagram depicting symbols of ISO 15693 during uplink transmission.

FIG. 10 illustrates a schematic diagram depicting symbols of ISO 15693 during uplink transmission. Referring to FIG. 10, in uplink transmission, the Manchester code with 847 KHz sub-carrier is adopted and the modulation method adopts OOK (on-off keying). This modulation method includes two symbols as shown in FIG. 10. When the logic 0 is transmitted, the serial data output terminal SOUT of the serial interface microcontroller 104 outputs "0101010101010000000000000000" to the switching element 105 according to the 847 KHz sub-carrier. When the logic 1 is transmitted, the serial data output terminal SOUT of the serial interface microcontroller 104 outputs "1111111111111111010101010101" to the switching element 105 according to the 847 KHz sub-carrier. Similarly, the data to be transmitted will be pre-stored in the memory and will be sent to the serial data output terminal SOUT of the serial interface microcontroller 104 by the DMA (Direct Memory Access) method.

In the abovementioned embodiments, although the serial interface microcontroller 104 receives envelope signal based on a serial peripheral interface (SPI) protocol, those skilled in the art should know that the serial interface microcontroller can also receive envelope signal based on an integrated interchip sound (I2S) protocol. Therefore, the present invention is not limited to the application of the SPI protocol. Additionally, in the abovementioned embodiments, the NFC LC resonant circuit 101 is implemented by coupling an NFC resonant coil and a resonant capacitor in parallel. However, those skilled in the art should know that the NFC LC resonant circuit 101 can also be implemented by using a series resonant configuration. Therefore, the present invention is not limited thereto.

Figure 11:
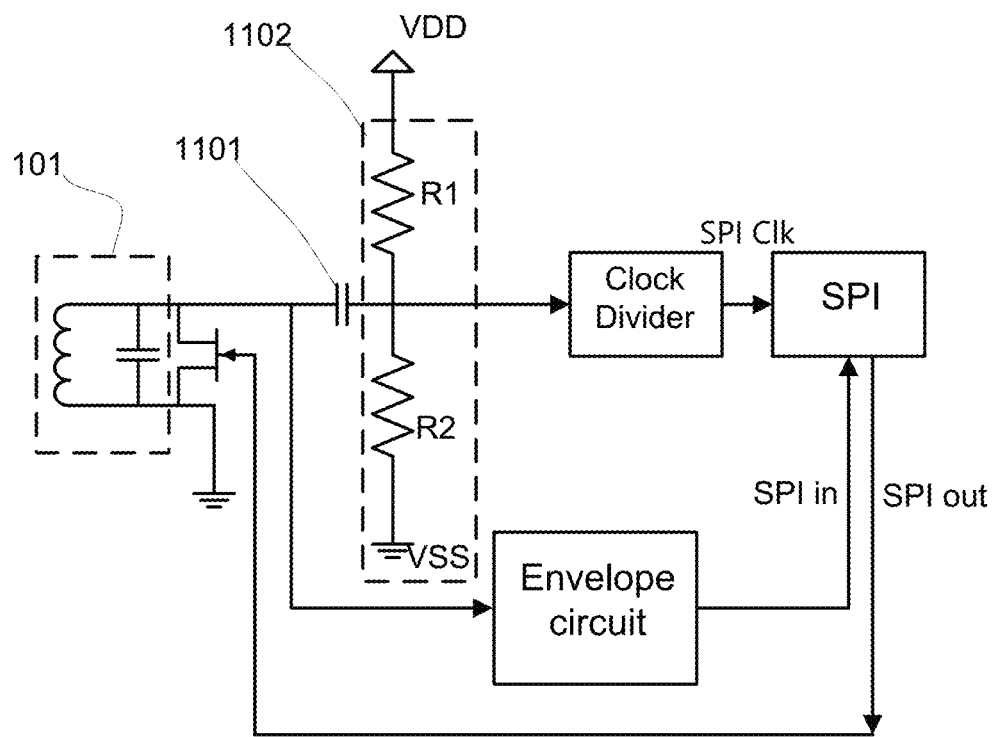
FIG. 11 illustrates a detailed circuit block diagram depicting the NFC tag device according to a preferred embodiment of the present invention.

FIG. 11 illustrates a detailed circuit block diagram depicting the NFC tag device according to a preferred embodiment of the present invention. Please compare FIG. 1 with FIG. 11. In the embodiment shown in FIG. 11, the NFC tag device has been added a DC blocking circuit 1101 and a bias circuit 1102. The DC blocking circuit 1101 includes a capacitor, which includes a first terminal and a second terminal. The first terminal of the DC blocking circuit 1101 is coupled to the first terminal of the NFC LC resonant circuit 101, and the second terminal of the DC blocking circuit 1101 is coupled to the input terminal of the frequency dividing circuit to block the DC component of the NFC carrier signal and to allow the AC component of the 13.56 MHz NFC carrier signal to pass through. In addition, the bias circuit 1102 includes two resistors, R1 and R2. The resistor R1 is coupled between the DC blocking circuit 1101 and the power supply voltage VDD, and the resistor R2 is coupled between the DC blocking circuit 1101 and the common voltage VSS. By the bias circuit 1102, the NFC carrier signal is operated between the power supply voltage VDD and the common voltage VSS.

Figure 12:
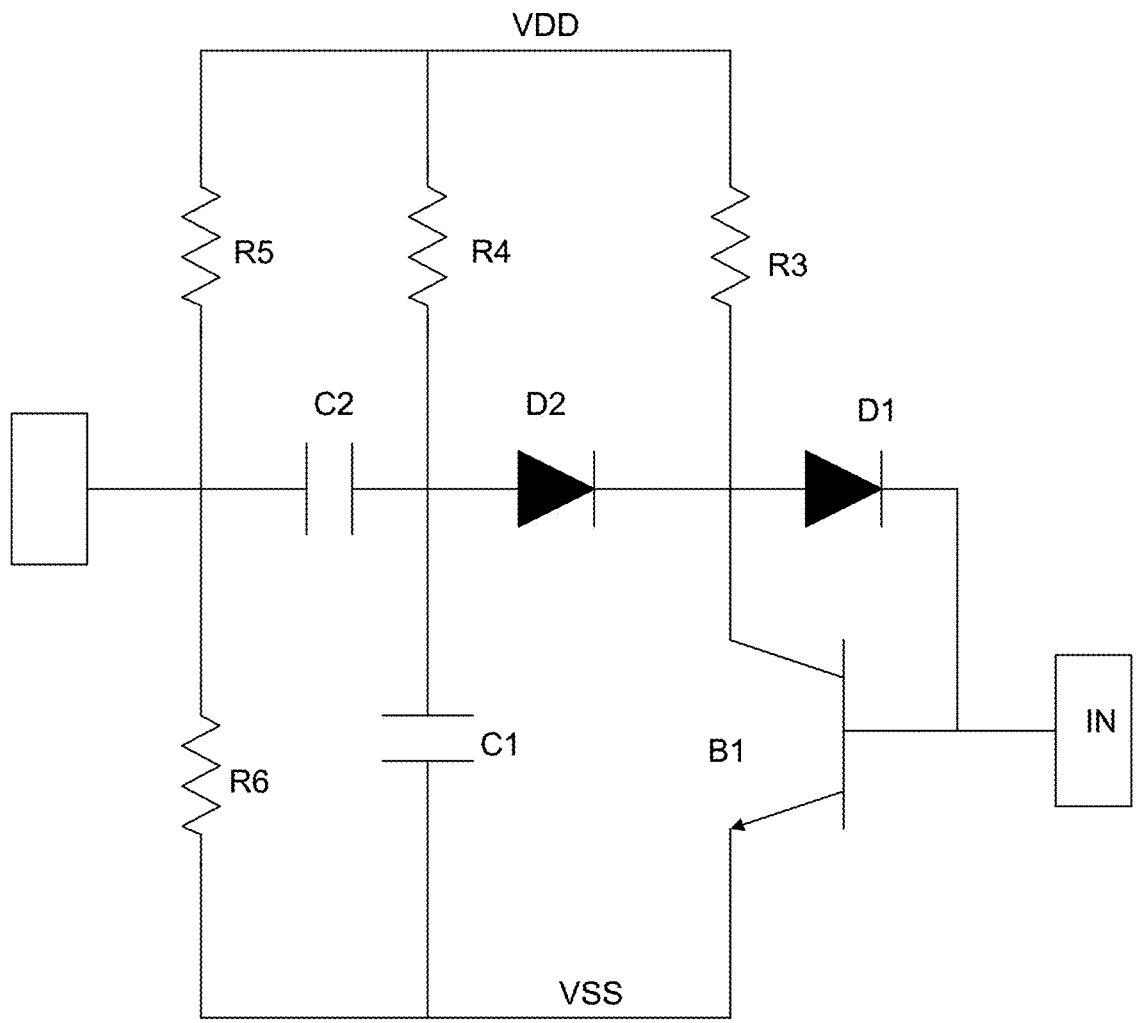
FIG. 12 illustrates a circuit diagram depicting the envelope detecting circuit 103 of the NFC tag device according to a preferred embodiment of the present invention.

FIG. 12 illustrates a circuit diagram depicting the envelope detecting circuit 103 of the NFC tag device according to a preferred embodiment of the present invention. Referring to FIG. 12, the envelope detecting circuit 103 comprises a third resistor R3, a fourth resistor R4, a fifth resistor R5, a sixth resistor R6, a first unidirectional conduction element D1, a second unidirectional conduction element D2, a first transistor B1, a first capacitor C1, and a second capacitor C2. The first terminal of the third resistor R3 is coupled to the power supply voltage VDD. The first terminal of the first unidirectional conduction element D1 is coupled to the second terminal of the third resistor R3, and the second terminal of the first unidirectional conduction element D1 is coupled to the input terminal IN of the envelope detecting circuit 103. In this embodiment, the first unidirectional conduction element D1 is implemented as a diode. The emitter terminal of the first transistor B1 is connected to the common voltage VSS. The collector terminal of the first transistor B1 is coupled to the first terminal of the first unidirectional conduction element D1, and the base terminal of the first transistor B1 is coupled to the second terminal of the first unidirectional conduction element D1.

The first terminal of the second unidirectional conduction element D2 is coupled to the second terminal of the second capacitor C2, and the second terminal of the second unidirectional conduction element D2 is coupled to the collector terminal of the first transistor B1. In this embodiment, the second unidirectional conduction element D2 is also implemented as a diode. The first terminal of the first capacitor C1 is coupled to the first terminal of the second unidirectional conduction element D2, and the second terminal of the first capacitor is coupled to the common voltage VSS. The first terminal of the fourth resistor R4 is coupled to the power supply voltage VDD, and the second terminal of the fourth resistor R4 is coupled to the first terminal of the second unidirectional conduction element D2. The first terminal of the second capacitor C2 is coupled to the output terminal OUT of the envelope detecting circuit, and the second terminal of the second capacitor C2 is coupled to the first terminal of the second unidirectional conduction element D2. The first terminal of the fifth resistor R5 is coupled to the power supply voltage VDD, and the second terminal of the fifth resistor R5 is coupled to the first terminal of the second capacitor C2. The first terminal of the sixth resistor R6 is coupled to the first terminal of the second capacitor C2, and the second terminal of the sixth resistor R6 is coupled to the common voltage VSS.

This embodiment is an envelope detecting circuit based on an operational amplifier. It has improved sensitivity and provide a wider dynamic range. By using the bipolar transistor B1 and the first unidirectional conduction element D1 for biasing, the bipolar transistor B1 can be operated in the forward active region continuously. The load resistor R4 is coupled to the power supply voltage VDD, providing a small bias current to the second unidirectional conduction element D2. The second unidirectional conduction element D2 rectifies the positive half-wave of the collector voltage of the bipolar transistor B1, and the voltage of the plates of the capacitor C2 follows the variations in the envelope signal. The second capacitor C2 primarily captures the AC component of the envelope signal while filtering out the DC component, and the fifth resistor R5 and the sixth resistor R6 provide biasing for the AC component of the envelope signal. The presence of the second capacitor C2, the fifth resistor R5, and the sixth resistor R6 is not mandatory and can be removed based on some circumstances or design requirements. The present invention is not limited thereto.

Both the first unidirectional conduction element D1 and the second unidirectional conduction element D2 are used to restrict the current flowing from the first terminal to the second terminal of the unidirectional conduction element. Those skilled in the art should know that, besides diodes, transistors with diode connection or other methods can also be implemented as unidirectional conduction element. The present invention is not limited thereto.

Figure 13:
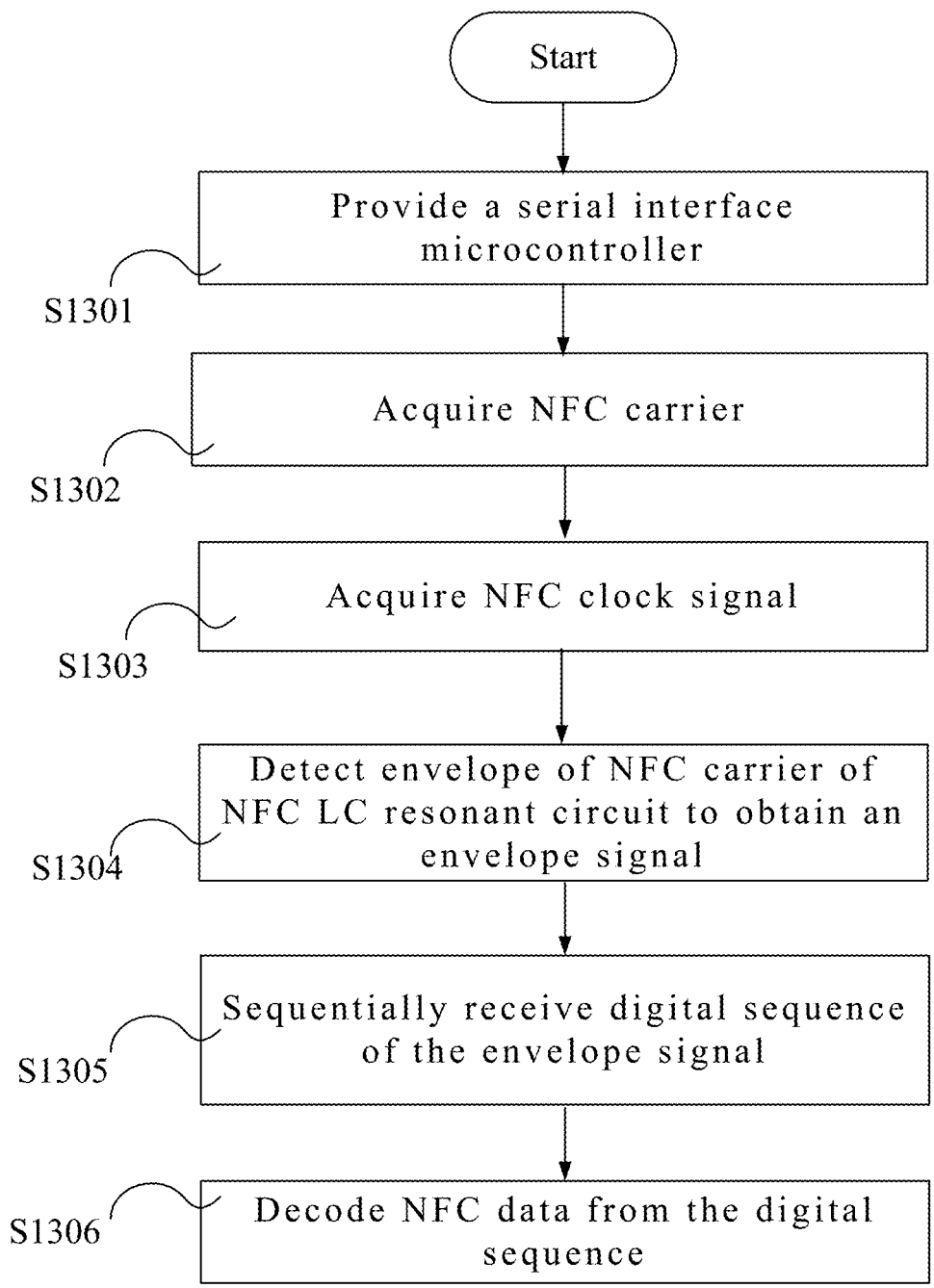
FIG. 13 illustrates a flow chart depicting a data receiving method in a method for near field communication with serial interface microcontroller according to a preferred embodiment of the present invention.

FIG. 13 illustrates a flow chart depicting a data receiving method for near field communication with serial interface microcontroller according to a preferred embodiment of the present invention. Referring to FIG. 13, the data receiving method includes the steps of:

In step S1301, a serial interface microcontroller is provided. The serial interface microcontroller 104 may be as shown in FIG. 1. Moreover, the serial interface microcontroller 104 includes a serial interface such as the SPI (Serial Peripheral Interface) bus or I2S (Integrated Interchip Sound) bus.

In step S1302, an NFC carrier signal is acquired through an NFC LC resonant circuit. In this embodiment, the 13.56 MHz NFC carrier signal is acquired.

In step S1303, the NFC carrier signal is frequency-divided to obtain an NFC clock signal. As the abovementioned embodiments, the frequency dividing circuit 102 performs frequency-dividing to the NFC carrier signal according to the type (ISO 14443A, 14443B or 15693) of NFC protocol.

In step S1304, an envelope detection on the NFC LC resonant circuit is performed to obtain an envelope signal. As the abovementioned embodiments in FIG. 1 to FIG. 10, the envelope detecting circuit 103 captures the envelope of the NFC carrier signal.

In step S1305, based on a serial transmission protocol, the digital sequence of the envelope signal is sequentially received according to the triggering of the NFC clock signal. As the abovementioned embodiments in FIG. 1 to FIG. 10.

In step S1306, an NFC data is decoded from the digital sequence of the envelope signal according to NFC protocol.

Figure 14:
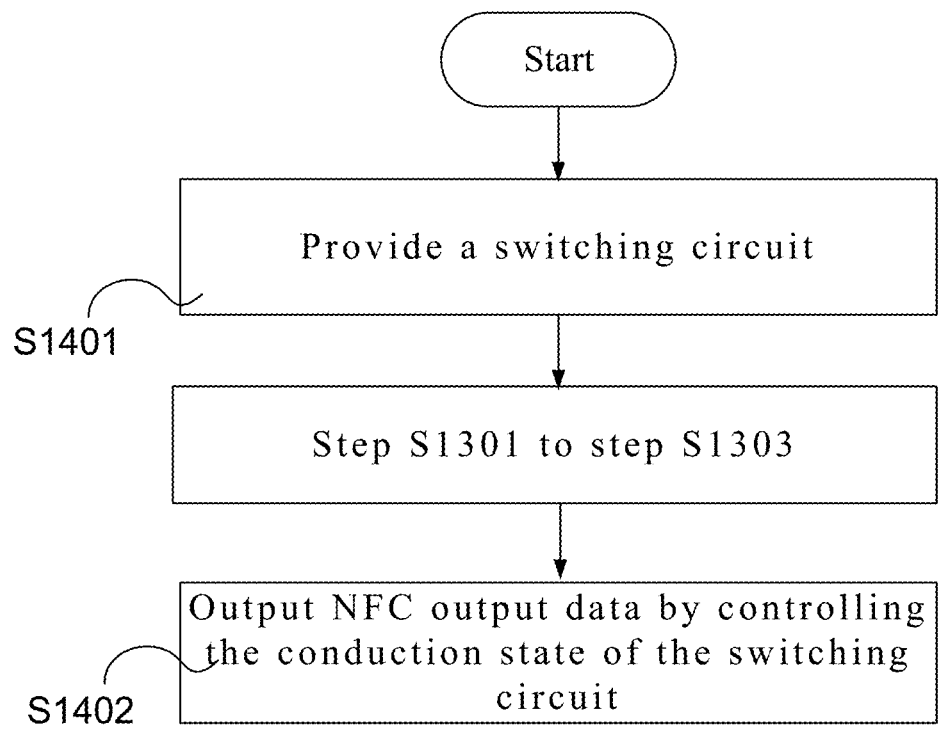
FIG. 14 illustrates a flow chart depicting a data transmission method in a method for near field communication with serial interface microcontroller according to a preferred embodiment of the present invention.

FIG. 14 illustrates a flow chart depicting a data transmission method for near field communication with serial interface microcontroller according to a preferred embodiment of the present invention. Referring to FIG. 13 and FIG. 14, the data transmission method for near field communication with serial interface microcontroller includes the steps of:

In steps S1401: a switching circuit is provided, which is coupled between the first terminal of the NFC LC resonant circuit and the second terminal of the NFC LC resonant circuit.

The steps S1301 to S1303 are as shown in the abovementioned embodiment.

In steps S1402, an NFC output data is output by controlling the conduction state of the switching circuit according to NFC protocol.

In summary, the spirit of the preferred embodiment of the present invention is to use the carrier signal extracted from the NFC coil, and a clock signal corresponding to the NFC modulation frequency is generated by frequency dividing to transmit it to the serial interface microcontroller. And, the modulated signal is then picked up by the NFC coil, and the binary digital sequence is demodulated by the envelope detecting circuit. And, the binary digital sequence is sequentially transmitted into the serial interface microcontroller according to the above-mentioned clock signal. Afterwards, through the serial interface microcontroller, the binary digital sequence of NFC is decoded into a near field communication data. Thus, the present invention can decode the near field communication data without using a specific integrated circuit for NFC, and the cost can be reduced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An NFC tag device, comprising:
   an NFC LC resonant circuit, comprising a first terminal and a second terminal;
   a frequency dividing circuit, comprising an input terminal and an output terminal, wherein the input terminal of the frequency dividing circuit is coupled to the first terminal of the NFC LC resonant circuit;
   an envelope detecting circuit, comprising an input terminal and an output terminal, wherein the input terminal of the envelope detecting circuit is coupled to the first terminal of the NFC LC resonant circuit;
   a serial interface microcontroller, comprising a clock input terminal and a serial data input terminal, wherein the clock input terminal of the serial interface microcontroller is coupled to the output terminal of the frequency dividing circuit, and the serial data input terminal of the serial interface microcontroller is coupled to the output terminal of the envelope detecting circuit,
   wherein the frequency dividing circuit divides an NFC carrier signal from the first terminal of the NFC LC resonant circuit into an NFC clock signal,
   wherein the envelope detecting circuit converts the received signal into an envelope signal,
   wherein the clock input terminal of the serial interface microcontroller receives the NFC clock signal, and the serial data input terminal of the serial interface microcontroller receives the envelope signal, for decoding an NFC data from the envelope signal according to the NFC protocol.

2. The NFC tag device according to claim 1, further comprising:
   a DC blocking circuit, comprising a first terminal and a second terminal, wherein the first terminal of the DC blocking circuit is coupled to the first terminal of the NFC LC resonant circuit, and the second terminal of the DC blocking circuit is coupled to the input terminal of the frequency dividing circuit for passing the NFC carrier signal.

3. The NFC tag device according to claim 2, further comprising:
   a bias circuit, coupled between the DC blocking circuit and the input terminal of the frequency dividing circuit such that the NFC carrier signal is operated between a power voltage and a common voltage.

4. The NFC tag device according to claim 3, wherein the bias circuit comprises:
   a first resistor, comprising a first terminal and a second terminal, wherein the first terminal of the first resistor is coupled to the power voltage, and the second terminal of the first resistor is coupled to the second terminal of the DC blocking circuit; and
   a second resistor, comprising a first terminal and a second terminal, wherein the first terminal of the second resistor is coupled to the second terminal of the DC blocking circuit, and the second terminal of the second resistor is coupled to the common voltage.

5. The NFC tag device according to claim 1, wherein the envelope detecting circuit comprises:
   a first resistor, comprising a first terminal and a second terminal, wherein the first terminal of the first resistor is coupled to a power voltage;
   a first unidirectional conduction element, comprising a first terminal and a second terminal, wherein the first terminal of the first unidirectional conduction element is coupled to the second terminal of the first resistor, and the second terminal of the first unidirectional conduction element is coupled to the input terminal of the envelope detecting circuit, wherein the first unidirectional conduction element limits a current flowing from the first terminal of the first unidirectional conduction element through the second terminal of the first unidirectional conduction element;

a first transistor, comprising an emitter terminal, a collector terminal and a base terminal, wherein the emitter terminal of the first transistor is coupled to a common voltage, the collector terminal of the first transistor is coupled to the first terminal of the first unidirectional conduction element, the base terminal of the first transistor is coupled to the second terminal of the first unidirectional conduction element;

a second unidirectional conduction element, comprising a first terminal and a second terminal, wherein the first terminal of the second unidirectional conduction element is coupled to the output terminal of the envelope detecting circuit, and the second terminal of the second unidirectional conduction element is coupled to the collector terminal of the first transistor, wherein the second unidirectional conduction element limits a current flowing from the first terminal of the second unidirectional conduction element through the second terminal of the second unidirectional conduction element;

a first capacitor, comprising a first terminal and a second terminal, wherein the first terminal of the first capacitor is coupled to the first terminal of the second unidirectional conduction element, and the second terminal of the first capacitor is coupled to the common voltage; and a second resistor, comprising a first terminal and a second terminal, wherein the first terminal of the second resistor is coupled to the power voltage, and the second terminal of the second resistor is coupled to the first terminal of the second unidirectional conduction element.

6. The NFC tag device according to claim 5, wherein the envelope detecting circuit further comprises:

a second capacitor, comprising a first terminal and a second terminal, wherein the first terminal of the second capacitor is coupled to the output terminal of the envelope detecting circuit, and the second terminal of the second capacitor is coupled to the first terminal of the second unidirectional conduction element;

a fifth resistor, comprising a first terminal and a second terminal, wherein the first terminal of the fifth resistor is coupled to the power voltage, and the second terminal of the fifth resistor is coupled to the first terminal of the second capacitor; and a sixth resistor, comprising a first terminal and a second terminal, wherein the first terminal of the sixth resistor is coupled to the first terminal of the second capacitor, and the second terminal of the sixth resistor is coupled to the common voltage.

7. The NFC tag device according to claim 1, wherein the serial interface microcontroller further comprises a serial data output terminal, and the NFC tag device further comprises:

a switching circuit, comprising a first terminal, a second terminal and a control terminal, wherein the control terminal of the switching circuit is coupled to the serial data output terminal of the serial interface microcontroller, the first terminal of the switching circuit is coupled to the first terminal of the NFC LC resonant circuit, and the second terminal of the switching circuit is coupled to the second terminal of the NFC LC resonant circuit, wherein the clock input terminal of the serial interface microcontroller receives the NFC clock signal, for outputting an NFC output data according to the NFC protocol by controlling the conduction state of the first terminal and the second terminal of the switching circuit.

8. The NFC tag device according to claim 1, wherein the NFC LC resonant circuit comprises:

an NFC resonant coil, comprising a first terminal and a second terminal, wherein the first terminal of the NFC resonant coil is coupled to the first terminal of the NFC LC resonant circuit, and the second terminal of the NFC resonant coil is coupled to the second terminal of the NFC LC resonant circuit; and a resonant capacitor, comprising a first terminal and a second terminal, wherein the first terminal of the resonant capacitor is coupled to the first terminal of the NFC LC resonant circuit, and the second terminal of the resonant capacitor is coupled to the second terminal of the NFC LC resonant circuit.

9. The NFC tag device according to claim 1, wherein the serial interface microcontroller receives the envelope signal according to Serial Peripheral Interface (SPI).

10. The NFC tag device according to claim 1, wherein the serial interface microcontroller receives the envelope signal according to Integrated Interchip Sound (I2S).

11. A method for near field communication with serial interface microcontroller, comprising:

providing a serial interface microcontroller;

acquiring an NFC carrier signal from an NFC LC resonant circuit;

frequency-dividing the NFC carrier signal to acquire an NFC clock signal;

acquiring an envelope signal by detecting an envelope of the NFC carrier signal of the NFC LC resonant circuit;

sequentially receiving a digital sequence of the envelope signal according to triggering of the NFC clock signal and a serial transmission protocol; and decoding the digital sequence of the envelope signal to acquire an NFC data according to an NFC protocol.

12. The method according to claim 11, wherein the serial interface protocol is Serial Peripheral Interface (SPI) such that the envelope signal is received according to SPI protocol.

13. The method according to claim 11, wherein the serial interface protocol is Integrated Interchip Sound (I2S) such that the envelope signal is received according to I2S protocol.

14. The method according to claim 11, further comprising:

providing a switching circuit, coupled between the first terminal of the NFC LC resonant circuit and the second terminal of the NFC LC resonant circuit; and outputting an NFC output data according to the NFC protocol by controlling the conduction state of the switching circuit.

* * * * *